Aug. 7, 1945.  R. A. MITCHELL ET AL  2,381,224
AIR RAID WARNING SYSTEM
Filed April 30, 1942  2 Sheets-Sheet 1

Fig.1

INVENTORS
ROBERT A. MITCHELL
CLAUDE M. HINES
BY
ATTORNEY

Aug. 7, 1945.  R. A. MITCHELL ET AL  2,381,224
AIR RAID WARNING SYSTEM
Filed April 30, 1942  2 Sheets-Sheet 2

INVENTORS
ROBERT A. MITCHELL
CLAUDE M. HINES
BY
ATTORNEY

Patented Aug. 7, 1945

2,381,224

UNITED STATES PATENT OFFICE 2,381,224

AIR RAID WARNING SYSTEM

Robert A. Mitchell, Wilmerding, and Claude M. Hines, Pittsburgh, Pa., assignors to The Westinghouse Air Brake Company, Wilmerding, Pa., a corporation of Pennsylvania Application April 30, 1942, Serial No. 441,196

16 Claims. (Cl. 177—8)

This invention relates to air raid warning systems and has particular relation to systems for selectively producing any one of a plurality of warning signals, each signal being specifically coded in a manner indicative of different information, such as "air raid" and "all clear."

It is an object of our invention to provide an air raid warning system, including one or more signal devices of the air-operated type, suited for installation and operation in connection with existing local facilities, such as automobile service stations or factories having compressor and air storage equipment.

It is another object of our invention to provide an air raid warning system of the type indicated in the foregoing object and further including an arrangement for selectively initiating any one of a plurality of coded signal sequences, either locally or by remote control.

It is another object of our invention to provide an air raid warning system of the type indicated in the foregoing objects and including automatic means for timing the duration of a particular coded signal sequence.

The above objects, and other objects of our invention which will be made apparent hereinafter, are attained by means subsequently to be described, and shown in the accompanying drawings, wherein.

Figure 1:
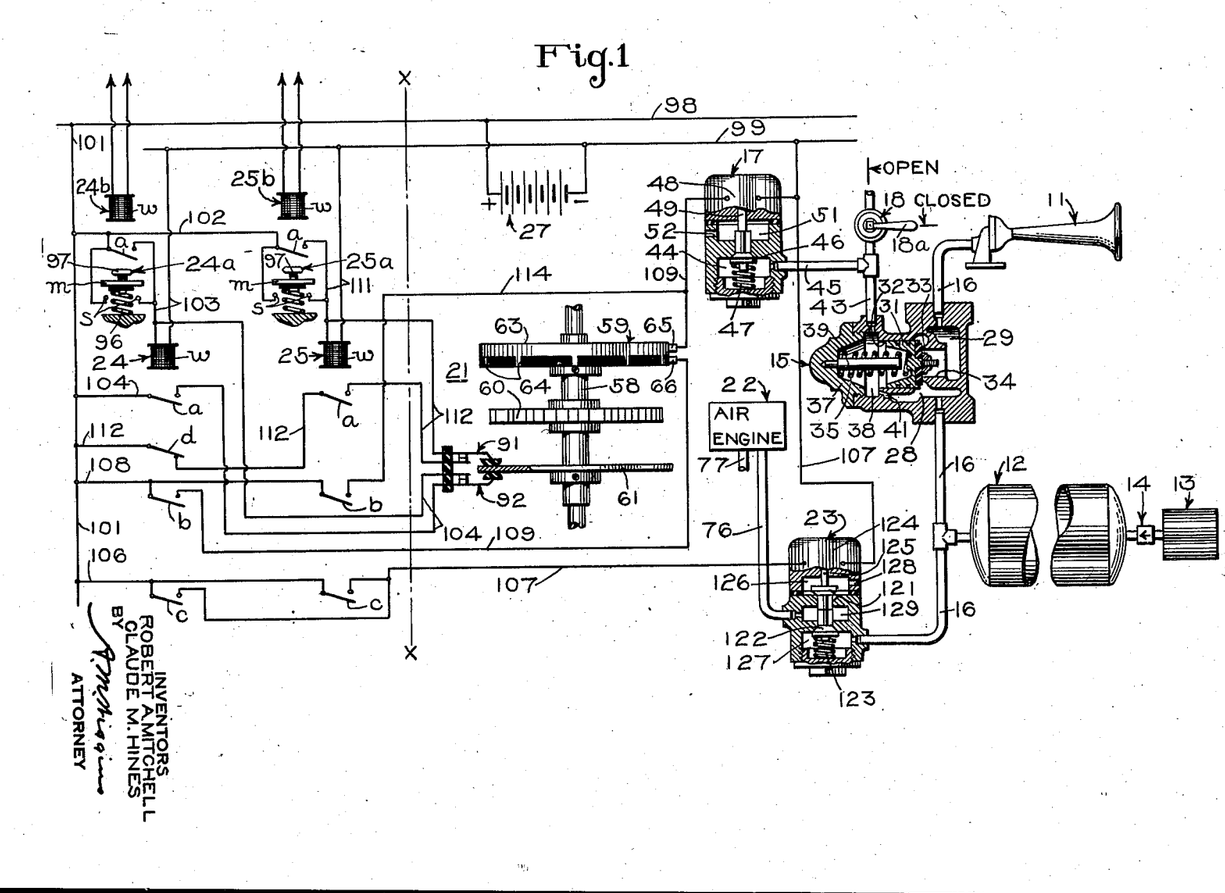
Fig. 1 is a diagrammatic view, showing an air raid warning system embodying our invention.

Description of system shown in Figure 1

The system shown in Fig. 1 comprises an audible signal device in the form of an air operated horn 11; a source of air under pressure such as a reservoir 12 charged to a certain operating pressure, such as one-hundred pounds per square inch, by a suitable fluid compressor 13 through a pipe including a one-way or check valve 14 for preventing back flow of fluid from the reservoir; an air operated control valve 15 of well known construction for controlling communication through a pipe 16 connecting the reservoir 12 to the horn 11; a magnet valve device 17 and a manually operated valve 18 for controlling the operation of the control valve 15; and apparatus for controlling the magnet valve device 17. According to our invention, the apparatus for controlling the magnet valve device 17 comprises a signal coding and timing device 21; an air engine 22 for operating the signal coding drum device; and a magnet valve device 23 for controlling the supply of fluid under pressure from the reservoir 12 to the air engine 22.

Additional control apparatus is provided comprising two control relays 24 and 25, hereinafter respectively designated the "air raid" relay and the "all clear" relay; two push-button type switches 24a and 25a controlling the "air raid" relay 24 and the "all clear" relay 25 respectively; and two remotely controlled relays 24b and 25b for also controlling the "air raid" relay 24 and "all clear" relay 25, respectively.

Electrical energy for operating the various magnet valve devices and relays is supplied from a suitable source, such as a storage battery 27 which is maintained charged by suitable charging equipment not shown.

Considering the parts of the equipment in greater detail, the air operated horn 11 may be of the type shown in Patent 2,263,342 to Norman F. Lewis, in which vibration of a sound producing diaphragm is effected in response to the continuous supply of air under pressure to the horn. It will be understood, however, that the particular type of horn and the construction thereof is immaterial as far as the present invention is concerned.

The control valve device 15 is the so-called A—1 application valve of fluid pressure brake equipments provided for railway cars and trains. Essentially, it comprises a suitable casing having two chambers 28 and 29 connected by different sections of the pipe 16 to the reservoir 12 and horn 11 respectively; and a piston valve 31 operating in a suitable bore 32 in the casing and biased into seated relation on a seat rib 33, at one end of a port 34 connecting chambers 28 and 29, by a coil spring 35. Spring 35 is interposed between the back face of the piston valve 31 and a cap nut 37 closing the open end of the chamber 38 at the back of the piston valve 31.

A stop pin 39 is secured in the cap nut 37 and extends into close proximity with the back face of the piston valve 31 to limit the degree of unseating movement thereof away from the seat rib 33.

The chamber 38 at the back of the piston valve 31 is connected to the chamber 28 by a restricted port 41. The flow area of the port 41 is such that when the air in chamber 38 is rapidly vented, the force of the air pressure in chamber 28 acting on the outer seated area of the piston valve 31 remains sufficiently greater than the air pressure in the chamber 38 to overcome the spring 35 and unseat the piston valve 31 upwardly, thereby opening communication between the chambers 28 and 29 through the port 34 and causing air under pressure to be supplied from the reservoir 12 to the horn 11. Moreover, the port 41 is so restricted that as long as chamber 38 is vented to atmosphere, the piston valve 31 remains unseated.

When the venting of chamber 38 is terminated, the chamber 38 becomes promptly charged through port 41 to the pressure in chamber 28 thereby causing the spring 35 to reseat the piston valve 31 and cut off the supply of air under pressure to the horn 11.

Air under pressure is vented from the chamber 38 of the control valve device 15 through an exhaust pipe 43 under the control of either the manually operated valve 18 or the magnet valve device 17.

The manually operated valve 18 may be of the conventional plug type having an operating handle 18a. The operating handle 18a of the manually operated valve 18 is normally in its closed position as shown and when rotated a predetermined amount in either direction out of its closed position opens the pipe 43 to atmosphere, thereby venting air under pressure from the chamber 38 at a rapid rate.

The magnet valve device 17 may be of any suitable type. As diagrammatically shown, the magnet valve device 17 comprises a suitable casing having a chamber 44 that is constantly connected through a branch pipe 45 to the exhaust pipe 43 for the control valve device 15; and a poppet valve 46 normally urged upwardly into seated position by a coil spring 47 and unseated downwardly upon energization of a magnet winding 48 through the medium of a plunger 49. Upon the unseating of the valve 46, the chamber 44 is connected to a chamber 51 that is constantly open to atmosphere through an exhaust port 52.

It will thus be seen that upon energization of the magnet winding 48 of the magnet valve device 17, air is rapidly exhausted from the chamber 38 of the control valve 15 to cause operation thereof to supply air from the reservoir 12 to the horn 11. Upon deenergization of the magnet winding 48, valve 46 is reseated—thereby causing control valve 15 to be operated to cut off the supply of air under pressure from the reservoir 12 to the horn 11.

Referring to Fig. 1, as well as to Figs. 2, 3, 4, and 5, the signal coding and timing device 21 comprises a suitable tubular casing 54 open at the opposite ends thereof and having a laterally extending tubular portion 55.

Figures 2, 4, 5:
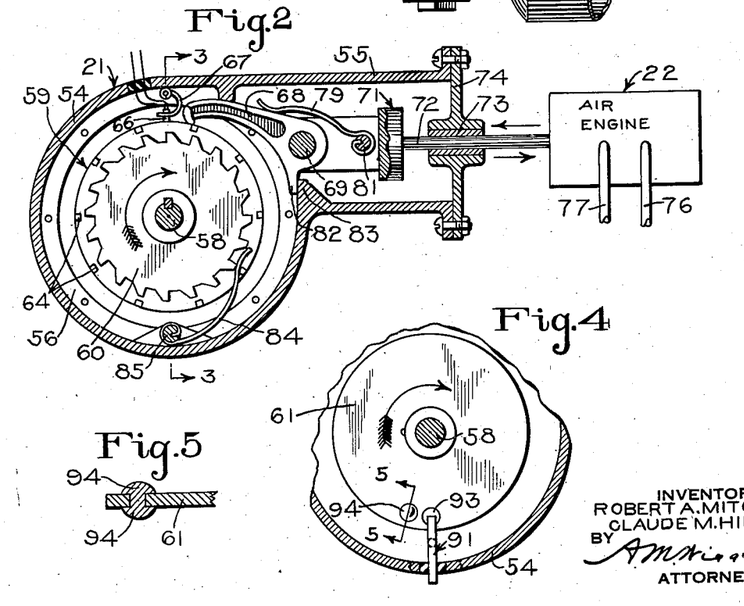
Fig. 2 is an enlarged sectional view, showing structural details of the specific mechanism for effecting operation of the signal coding and timing device of Fig. 1.
Fig. 4 is a fragmental sectional view, taken substantially on the line 4—4 of Fig. 3, showing further details of the cam operated switches shown in Fig. 3.
Fig. 5 is a fragmental enlarged view, taken on the line 5—5 of Fig. 4, showing a detail of the cam disk of Fig. 4.
Figures 3, 6:
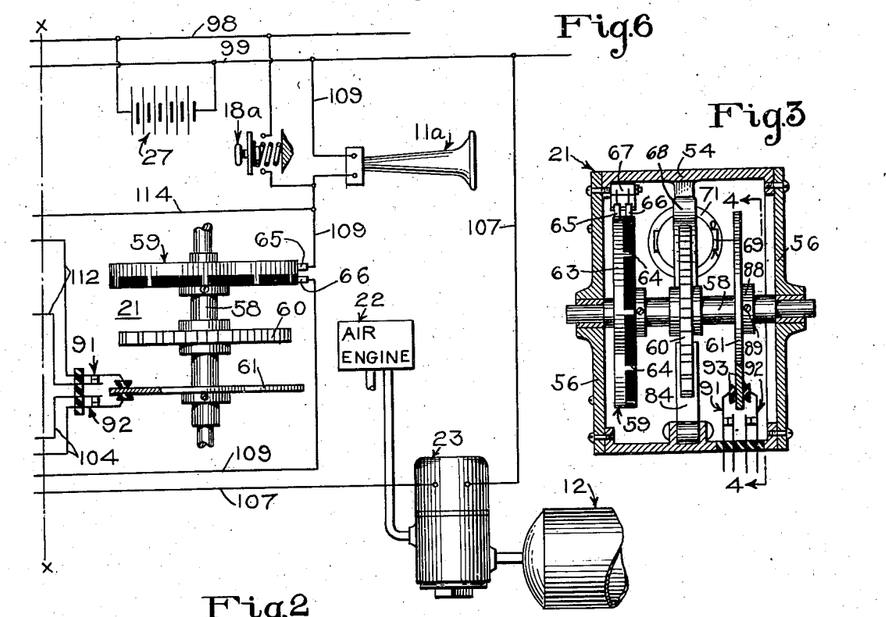
Fig. 3 is a vertical sectional view, taken on the line 3—3 of Fig. 2, showing further details of the construction and arrangement of the mechanism shown in Fig. 2.
Fig. 6 is a fragmental diagrammatic view, showing a modification of Fig. 1, in which an electrically operated signal device is substituted for the air operated signal device.

Supported in bearings carried by end covers 56 suitably secured to opposite ends of the tubular casing 54 is a rotary shaft 58 on which a commutator or coding drum 59, a ratchet wheel 60, and a cam disk 61 are fixed in axially spaced relation.

The commutator 59 comprises a disk of suitable insulating material having secured or embedded in the peripheral surface thereof a continuous conducting ring 63 of suitable metal such as brass, copper, or alloys thereof, which ring has a plurality of contact fingers 64 extending laterally therefrom in equally spaced relation circumferentially. The outside surface of the ring 63 and the contact fingers 64 are flush with the outer periphery of the insulating disk at points between the contact fingers 64 to form a smooth contact surface for a pair of brushes 65 and 66 which are supported by a brush holder 67, attached to the casing 54, in a manner to engage the continuous ring 63 and the contact fingers 64 respectively.

Thus, upon rotation of the commutator 59, the brushes 65 and 66 are periodically connected whenever brush 66 engages any one of the contact fingers 64.

Rotation of the shaft 58 is effected by means of a pawl 68 associated with the ratchet wheel 60, the pawl being pivoted on a pin 69 in a yoke member 71 at the end of a reciprocating shaft 72. Shaft 72 is slidably supported in a suitable bearing 73 in a cover member 74 attached to the outer open end of the tubular portion 55 of the casing and is reciprocated back-and-forth by means of the air engine 22.

Details of the air engine 22 are not shown inasmuch as engines of this type are well known. Briefly, however, air engine 22 may comprise one or more pistons connected to the shaft 72; and reversing valve mechanism operated in response to reciprocation of the shaft in a manner to control the application of fluid pressure forces to the piston or pistons so as to cause reciprocation of the shaft 72 in response to the continuous supply of air under pressure to the air engine through a pipe 76, which air is exhausted through a pipe 77.

A spring 79 of the leaf type is secured to a pin 81 fixed in the yoke 71 and serves to urge the pawl 68 downwardly into engagement with the teeth of ratchet wheel 60. The pawl 68 has a projecting lug 82 therein which engages a stop shoulder 83 formed on the casing to cause the pawl to be raised out of engagement with the teeth of the ratchet wheel upon a predetermined movement of the shaft 72 in the right-hand direction.

When the shaft 72 is shifted in the left-hand direction, the lug 82 on the pawl moves away from the stop shoulder 83 on the casing, thereby permitting the spring 79 to pivotally move the pawl 68 downwardly into engagement with the teeth of the ratchet wheel. Upon the subsequent movement of the shaft 72 in the right-hand direction, the pawl 68 remains in engagement with the teeth of the ratchet wheel sufficiently long to advance the ratchet wheel through an angle corresponding to the pitch distance between two successive teeth before being raised out of engagement with the teeth due to the engagement of the lug 82 on the pawl with the stop shoulder 83 on the casing.

It will thus be seen that the continued reciprocation of the shaft 72 causes the ratchet wheel to be advanced in step-by-step manner in a clockwise direction, as indicated by the arrow on the ratchet wheel in Fig. 2.

It will be observed that the commutator 59 is fixed on the shaft 68 in such a manner that the contact fingers 64 are in axial alignment with alternate teeth on the ratchet wheel. While any number of ratchet wheel teeth, and commutator contact fingers may be employed, we have for purposes of illustration shown a ratchet wheel having twenty teeth and a commutator having ten contact fingess. The reason for the one-to-two ratio between the number of contact fingers and the number of teeth on the ratchet wheel will be explained hereinafter.

In order to hold the shaft firmly in a given position until advanced by operation of the pawl 68, a leaf spring 84 is secured at one end to a pin 85 fixed in the casing at a point below the ratchet wheel, the free end of the spring being curved so as to firmly engage between two successive teeth of the ratchet wheel 60.

It should be understood that the arrangement including a ratchet wheel and pawl carried by a reciprocating shaft for effecting rotation of a shaft carrying the ratchet wheel is not in itself our invention inasmuch as this mechanism is similar to the slack adjuster operator for brake shoes of fluid pressure brake equipment on railway cars. Moreover, while we have illustrated a specific form of operator for rotating the shaft 58, it will be understood that any suitable mechanism may be employed for effecting rotation of the shaft 58 in response to the continuous supply of air under pressure to an air engine.

The cam disk 61 comprises an annular metallic member of suitable rigidity provided with a hub 88 which may be fixed on the shaft 58 as by a set screw 89.

Associated with the cam disk 61 are a pair of telephone type switches 91 and 92. Each of the switches 91 and 92 comprises a pair of flexible contact fingers carrying suitable contacts normally engaging each other, one of the contact fingers in each switch being extended and carrying a button or contact piece 93 of insulating material which slidably engages a corresponding face of the cam disk 61.

The cam disk has two spherically curved cams 94 on opposite faces of the cam disk 61 and in axial alignment with each other. As shown in Fig. 5, the two cams 94 may be formed by a single element in the form of a rivet extending through a suitable circular hole in the cam disk, both ends of the rivet being suitably rounded after riveting.

As the cam disk 61 rotates, the cams 94 engage the button 93 of the corresponding switch 91 or 92 and bend the corresponding contact finger axially away from the face of the cam disk to effect separation of the contacts carried by the contact fingers and consequent opening of the switch. The arrangement is obviously such as to cause only a momentary opening of the switches 91 and 92 and subsequent reclosure thereof, as the cam disk 61 rotates through a certain rotary position of the shaft 58.

The supply of air to operate air engine 22 is controlled by magnet valve 23. Magnet valve 23 is a standard type valve and as shown in the drawing comprises a suitable casing containing two oppositely seating valves 121 and 122, a spring 123 for urging the valves simultaneously upward and a magnet winding 124 effective when energized to actuate the valves simultaneously downwardly through the medium of a plunger 125. Valves 121 and 122 are contained in chambers 126 and 127 respectively, the chamber 126 being constantly open to atmosphere through an exhaust port 128 and the chamber 127 being constantly connected to the reservoir 12 by a section of the pipe 16.

The valves 121 and 122 have fluted stems which engage in end-to-end contact within a chamber 129 that is connected to the air engine by the pipe 76.

When the magnet winding 124 is deenergized, the spring 123 shifts the valves 121 and 122 to unseated and seated positions respectively. Valve 121 is effective in its unseated position to connect chamber 129 to the chamber 126 and accordingly cause air under pressure to be vented to atmosphere from the pipe 76 through the exhaust port 128. Upon energization of the magnet winding 124, the valves 121 and 122 are shifted downwardly into seated and unseated positions respectively. In its seated position the valve 121 closes the exhaust communication for the pipe 76. In its unseated position valve 122 opens communication between the chamber 127 and the chamber 129 thereby causing air under pressure to be supplied from the reservoir 12 to the air engine 22.

It will thus be seen that air under pressure is supplied from the reservoir 12 to the air engine 22 whenever and as long as the magnet winding 124 of the magnet valve 23 is energized.

The control relays 24 and 25 are standard type electrical relays of the direct-current type having a single winding $w$ and contacts operated in response to the energization and deenergization $w$. The relay 24 has three front contacts $a$, $b$, and $c$ and one back contact $d$. The relay 25 has three front contacts $a$, $b$, and $c$.

It will be understood that the term "front contact" refers to a contact which is in the dropped-out or open position when the winding of the relay is deenergized and which is actuated to a picked-up or closed position in response to energization of the winding whereas the term "back contact" refers to a contact which is in its dropped-out or closed position when the winding of the relay is deenergized and which is actuated to its picked-up or open position in response to energization of the winding of the relay.

The push button switches 24a and 25a may be of any suitable type in which the contact elements are in open position normally and which requires the application of manual pressure to be actuated to or maintained in the closed position. As diagrammatically shown, each of the switches 24a and 25a may comprise two stationary contacts $s$ and a movable contact $m$ which is biased by a spring, such as a coil spring 96, out of engagement with the stationary contacts $s$ and into contact with the contacts $s$ by application of manual pressure to a thumb button 97 fixed in insulated relation to contact $m$.

The relays 24b and 25b are standard direct-current relays of the neutral type, each having a winding $w$ and a single front contact $a$.

The winding of relays 24b and 25b are connected by suitable wires to a remote control station and may be selectively energized and deenergized by controlling the circuit at the remote control station.

For practical purposes, the relays 24b and 25b may be connected to a telephone exchange whereby the operator at the exchange may control the relays.

*Operation of system shown in Figure 1*

Let it be assumed that the operator at the remote control station desires to cause the horn 11 to signal an "air raid." To do so he operates a switch (not shown) at the remote control station to cause energization of the magnet winding $w$ of the relay $24b$ for a short interval of time.

Upon the pick-up of the contact $a$ of the relay $24b$ a circuit is established for energizing the winding $w$ of the "air raid" relay 24. This circuit extends from a positive bus wire 98, in turn connected to the positive terminal of the battery 27, thence by way of a branch wire 101, a second branch wire 102, contact $a$ of the relay $24b$, and a wire 103 including the winding $w$ of the relay 24 to a negative bus wire 99 which is in turn connected to the negative terminal of the battery 27.

The contact $a$ of the relay 24 is effective in its picked-up or closed position to establish a self-holding circuit for the relay 24. This circuit extends from the positive bus wire 98 by way of the branch wire 101, another branch wire 104 including in series relation therein the contact $a$ of the relay 24 and the switch 92 associated with the cam disk 61 of the signal coding device 21 to the wire 103, and thence through the winding $w$ of the relay 24 to the negative bus wire 99.

The contacts of the relay 24 accordingly remain "stuck up" independently of the drop-out of the contact $a$ of the remotely controlled relay $24b$. It will thus be seen that the relay $24b$ need only be picked-up a sufficient length of time to insure the establishment of the self-holding circuit for the winding of the relay 24.

The contact $c$ of the relay 24 is effective in its picked-up or closed position to establish a circuit for energizing the magnet winding of the magnet valve 23. This circuit extends from the positive bus wire 98 by way of the wire 101, a branch wire 106, contact $c$ of relay 24, and a wire 107 including the magnet winding of the magnet valve 23, to the negative bus wire 99.

The magnet valve 23 is accordingly operated to cause air under pressure to be supplied from reservoir 12 through the pipes 16 and 76 to the air engine 22. The air engine 22 is thus operated to cause reciprocation of the shaft 72 and the consequent rotation of the shaft 58 of the signal coding and timing device 21. The air engine 22 is a relatively slow speed engine and the speed of reciprocation of the shaft 72 is such as to cause rotation of the shaft 58 through one full revolution in an appreciable length of time, such as two minutes.

As shown in Fig. 2, the brushes 65 and 66 associated with the commutator 59 are normally mid-way between two successive contact fingers 64 in the normal stopped position of the shaft 58. It is necessary, therefore, that the ratchet wheel 60 be advanced rotatively through an angle corresponding to the pitch distance between two successive teeth before the brushes 65 and 66 are connected by the engagement of the brush 66 with a contact finger 64. Upon the connection of the brushes 65 and 66 by the commutator 59, a circuit is completed for energizing the magnet winding 48 of the magnet valve 17. This circuit extends from the positive bus wire 98 by way of the wire 101, a branch wire 108, contact $b$ of relay 24, a wire 109 including in series relation therein the switch device formed by the commutator 59 and the brushes 65 and 66, and the magnet winding 48 of the magnet valve 17 to the wire 107, and thence to the negative bus wire.

The magnet valve 17 is accordingly operated to rapidly vent air under pressure from the chamber 38 of the control valve 15, thereby causing unseating of the piston valve 31 and the consequent supply of air under pressure from the reservoir 12 through the pipe 16 to the horn 11. The horn 11 accordingly produces an audible blast or signal as long as air under pressure is supplied thereto, which in turn is determined by the length of time that the magnet winding of the magnet valve 17 is energized. In view of the fact that the ratchet wheel 60 and the shaft 58 remain stationary during the interval of time that the reciprocating shaft 72 advances and returns to move the succeeding tooth into the position occupied by the preceding tooth of the ratchet wheel, it will be seen that the circuit for energizing the magnet winding of the magnet valve 17 remains energized for a corresponding length of time.

On the basis of a full revolution of the shaft 58 in a time such as two minutes, and assuming twenty teeth on the ratchet wheel 60, it will be seen that the commutator 59 remains stationary in any one given position for a time slightly less than six seconds.

If a commutator finger 64 were provided for each tooth of the ratchet wheel 60, the brushes 65 and 66 would be disconnected only momentarily during the interval in which the ratchet wheel was being advanced one tooth pitch distance. In such case the horn 11 would operate to produce a succession of relatively long blasts or signals separated by relatively short intervals of silence.

In order, therefore, to cause the interval of silence between two successive blasts of the horn to correspond substantially to the length of time that a signal is being given by the horn, the number of contact fingers 64 of the commutator 59 is only one-half the number of teeth on the ratchet wheel. It will thus be seen that when the ratchet wheel 60 is advanced only one tooth distance from a position in which the brushes 65 and 66 are connected by a contact finger 64, the contact finger 66 remains in engagement with the insulating portion of the commutator and consequently the circuit for energizing the magnet winding of the magnet valve 17 is interrupted while the ratchet wheel remains in such position.

When the ratchet wheel 60 is subsequently advanced one more tooth distance, the brushes 65 and 66 are again connected by the engagement of the brush 66 with the contact fingers 64.

Thus, due to the fact that the ratchet 60 and commutator 59 remains stationary in successive positions for equal intervals of time, the step-by-step rotation of the ratchet wheel 60 automatically causes the circuit for energizing the magnet winding of the magnet valve 17 to be energized and deenergized alternately for substantially equal intervals of time of the order of six seconds each. Accordingly, the step-by-step rotation of the ratchet wheel 60 causes alternate operation and silence of the horn 11 for intervals of six seconds each.

Obviously, the duration of the audible signal given by the horn and the duration of the interval of silence may be varied as desired by selecting a desired number of ratchet teeth and a desired ratio of the number of contact fingers 64 of the commutator 59 to the number of teeth on the ratchet wheel 60. In any case, if the length of time that the audible signal is given is to be equal or substantially equal to the interval of silence, the number of contact fingers 64 on the commutator should be one-half the number of teeth on the ratchet wheel.

The magnet winding of the magnet valve 23 remains energized to cause air under pressure to be continuously supplied to the air engine 22 so as to continue the step-by-step rotation of the shaft 58 as long as the relay 24 is picked-up. The horn 11 is thus operated automatically to produce audible signals or blasts at regular intervals as long as the signal coding drum or commutator 59 continues to rotate.

When the commutator 59 and shaft 58 have been rotated through one complete revolution, the cams 94 on the cam disk 61 cause switches 91 and 92 to be momentarily opened. Opening of the switch 91 at this time is without effect. The opening of the switch 92, however, interrupts the previously described self-holding circuit for the winding of the relay 24. As a result, the contacts of the relay 24 are restored to their respective dropped-out positions before the switches 91 and 92 can be reclosed in response to the continued rotation of the cam disk 61.

Upon the restoration of the contacts of the relay 24 to their dropped-out positions, the circuits for energizing the magnet windings of the magnet valves 17 and 23 are interrupted by their respective controlling contacts b and c.

The control valve 15 is thus restored to its closed position in response to the deenergization of the magnet winding of the magnet valve 17 to terminate the further supply of air under pressure to the horn 11. At the same time deenergization of the winding of the magnet valve 23 causes operation of the magnet valve 23 to cut off the further supply of air under pressure to the air engine 22.

The cut off of the supply of air under pressure to the air engine 22 and the consequent venting of air under pressure from the pipe 76 does not occur sufficiently rapidly in response to the deenergization of the winding 124 of the magnet valve 23 to prevent the completion of the stroke of the shaft 72 and the consequent shifting of the ratchet wheel to a predetermined position in which it is yieldingly held by the biasing spring 84. Consequently, sufficient rotation of the cam disk 61 continues following interruption of the self-holding circuit for the winding of relay 24 by switch 92 to carry the cams 94 past the insulating buttons 93 of the switches 91 and 92 to permit reclosure of the switches.

The cam disk 61 is so fixed on the shaft 58 that the cams 94 bear a predetermined angular relation to the contact fingers of the commutator 59 and to the teeth of the ratchet wheel 60. This angular relation is such that the switches 91 and 92 are opened momentarily during the time that the pawl 68 is advancing the ratchet wheel from one stopped position, in which the brushes 65 and 66 are connected, to the next stopped position, in which the brushes are disconnected.

Accordingly, it will be seen that when the ratchet wheel and commutator come to a stop in response to stoppage of the air engine 22, brush 66 engages the insulating portion between successive contact fingers 64. At the same time, the switches 91 and 92 are re-closed to render the pick-up circuit for the winding of relay 24 potentially effective.

If it is desired to repeat the "air raid" signal, the operator at the remote control station may again cause energization of the winding of the relay 24b and the consequent pick-up of the contact a thereof to again initiate the operating cycle previously described. If a local operator desires to cause an "air raid" signal to be given, he may do so by momentarily depressing the push button switch 24a. The push button switch 24a is connected in parallel with the contact a of the relay 24b and consequently closure of the switch 24a causes pick-up of the relay 24 in the same manner as does the pick-up of the relay 24b. It is, therefore, deemed unnecessary to describe the operation of the apparatus when so initiated, because it is identical to that initiated in response to pick-up of the relay 24b.

Now let it be assumed that the operator at the remote control station desires to cause the horn 11 to produce the "all clear" signal. In such case, he causes the circuit of the winding w of the relay 25b to be closed so as to cause energization thereof and the consequent pick-up of the contact a.

Contact a of the relay 25b is effective in its picked-up or closed position to cause energization of the winding w of the "all clear" relay 25 and the consequent pick-up of the contacts of this relay. The circuit for energizing the winding of the relay 25 extends from the positive bus wire 98 by way of the wires 101 and 102, contact a of the relay 25b, and a wire 111 including the winding w of the relay 25 to the negative bus wire 99.

The contact a of the relay 25 is effective in its picked-up or closed position to establish a self-holding circuit for the winding of the relay 25. This circuit extends from the positive bus wire 98 by way of the wire 101, a branch wire 112 including in series relation therein the back contact d of the relay 24, contact a of the relay 25 and the cam operated switch 91 to the wire 111, and thence through the winding w of the relay 25 to the negative bus wire 99.

It will thus be seen that the contacts of the relay 25 are "stuck-up" in response to the establishment of the self-holding circuit just described, independently of the subsequent restoration of the contacts a of the relay 25b to its open position.

The contact b of the relay 25 is effective in its picked-up or closed position to establish a circuit for continuously energizing the magnet winding 48 of the magnet valve 17 independently of the commutator 59 of the signal coding and timing device 21. This circuit extends from the positive bus wire 98 by way of the wire 101, branch wire 108, contact b of the relay 25, and wire 114 to the wire 109, thence by way of wire 109 including the winding 48 of the magnet valve 17 to the wire 107 which is in turn connected to the negative bus wire 99.

As in the case of the "air raid" signal, energization of the magnet winding of the magnet valve 17 causes operation of the control valve 15 to open communication through the pipe 16 from the reservoir 12 to the horn 11 thereby causing the horn 11 to emit a continuous blast as long as the winding 48 of the magnet valve 17 is energized. As will be explained presently, the magnet winding 48 of the magnet valve 17 remains energized as long as the "all clear" relay 25 remains pick-up, which in turn is determined by the time required for a complete revolution of the shaft 58 of the signal coding device 21.

The contact c of the relay 25 is connected in parallel relation to contact c of the relay 24 and consequently is effective in its picked-up or closed position to establish a circuit for energizing the magnet winding of the magnet valve 23. The magnet valve 23 is accordingly operated to supply air under pressure from the reservoir 12 to the air engine 22, which in turn operates to cause revolution of the shaft 58 in step-by-step manner.

When the shaft 58 has been rotated a full revolution by the air engine 22, the time required for one complete revolution being assumed to be two minutes, the cams 94 on the cam disk 61 cause opening of the cam operated switches 91 and 92. The opening of the switch 92 is without effect at this time but the opening of the switch 91 interrupts the self-holding circuit for the magnet winding w of the relay 25, thereby causing contacts of the relay 25 to be restored to their respective dropped-out positions.

As previously described, the cams 94 on the cam disk 61 have such angular relation with respect to the teeth of the ratchet wheel 60 as to cause momentary opening of the switches 91 and 92 while the pawl 68 is advancing the ratchet wheel. Consequently, the cams are carried past the switches 91 and 92 to effect closing of the switches before reciprocation of the shaft 72 by the air engine 22 is stopped.

It will be apparent that the supply of air under pressure to the air engine 22 is terminated promptly in response to the deenergization of the magnet winding of the magnet valve 23 caused by the restoration of the contact c of the relay 25 to its dropped-out or open position. At the same time, the restoration of the contact b of the relay 25 to its dropped-out or open position interrupts the circuit for energizing the magnet winding 48 of the magnet valve 17. The magnet valve 17 is accordingly restored to its closed position and the control valve 15 is accordingly operated to closed position to cut off the further supply of air under pressure from the reservoir 12 to the horn 11, thereby terminating the continuous audible blast of the horn.

If the operator at the remote control station desires to repeat the "all clear" signal, he may do so by again causing momentary pick-up of the relay 25b, thereby causing a repetition of the continuous blast of the horn 11 for a time determined by the time required for the shaft 58 of the signal coding device 21 to be rotated one full revolution.

As in the case of the "air raid" signal, a local operator may effect operation of the horn 11 to sound the "all clear" signal by operation of the push button switch 25a. The push button switch 25a is connected in parallel to the contact a of the relay 25b and consequently operates to initiate the same cycle of operation in exactly the same manner as does pick-up of the relay 25b.

If it is desired to interrupt the "all clear" signal at any time for the purpose of immediately causing the sounding of an "air raid" signal, the operator stationed at the remote control station may do so by causing pick-up of the relay 24b. In such case, the consequent actuation of the back contact d of the "air raid" relay 24 to its picked-up or open position interrupts the self-holding circuit for the winding w of the "all clear" relay 25, thereby causing the contacts of the relay 25 to be restored to their respective dropped-out positions. The "all clear" signal is thus immediately supplanted by the "air raid" signal which continues for the remainder of the operating time of the instant cycle.

If for any reason, the local operator is unable to cause operation of the horn 11 by the push button switches 24a and 25a, he may nevertheless cause the horn 11 to be operated in a manner to simulate either the "air raid" signal or the "all clear" signal, by operation of the manually operated valve 18. Obviously, in the case of the "air raid" signal, it is necessary for the operator to open the valve 18 to cause opening of the control valve 15 and reclose the valve 18 to cause reclosure of the valve 15 in a manner simulating the operation of the control valve 15 by the signal coding commutator 59. In the case of the "all clear" signal, the operator merely opens the valve 18 for a length of time corresponding to the usual time for the "all clear" signal, such as the two minutes, and then recloses the valve.

*Embodiment shown in Figure 6*

The system shown in Fig. 6 differs essentially from that shown in Fig. 1 in providing an electrically operated horn 11a in place of the air operated horn 11. For simplicity, only a portion of the complete system is shown in Fig. 6, it being understood that the remaining portion of the system to the left of the vertically extending broken line X—X corresponds identically to that portion of the system shown to the left of the broken line X—X in Fig. 1, the various wires in Fig. 6 registering with and being connected to correspondingly numbered wires to the left of the broken line X—X in Fig. 1.

Specifically, the electrically operated horn 11a is connected in the wire 109 in place of the magnet winding 48 of the magnet valve 17 of Fig. 1 and at the same time the magnet valve 17, the control valve 15, the horn 11, and the manually operated valve 18 are omitted.

Operation of the system is substantially the same as previously described for the system of Fig. 1 and accordingly it is deemed unnecessary to specifically describe such operation.

In order to simulate the function of the manually operated valve 18 in the system of Fig. 1, a push button switch 18a is provided in the system of Fig. 6 for connecting the electrically operated horn 11a directly across the bus wires 98 and 99 to cause it to produce any desired intermittent or continuous signal.

*Summary*

Summarizing, it will be seen that we have disclosed an air raid warning system for operating either an air operated horn device or an electrically operated horn device to produce coded "air raid" and "all clear" signals either by remote control or by a local operator.

The system operates automatically to produce blasts of the horn device at regular intervals for a predetermined time to indicate an "air raid" signal and a continuous blast for a predetermined time to indicate the "all clear" signal in response to a momentary control impulse given by the operator.

Having now described our invention, what we claim as new and desire to secure by Letters Patent, is:

1. In a signal system having a source of air under pressure and an air operated signal device, the combination of valve means for controlling the supply of air under pressure from said source to said signal device, a rotary member for periodically causing operation of said valve means to supply air under pressure to said signal device, an air operated engine for causing rotation of said rotary member, a valve device for controlling the supply of air under pressure from said source to said air operated engine, means operative to cause continued operation of said valve device to supply air under pressure to said air engine, and timing means set in operation in response to the operation of the last said means for causing operation of said valve device to terminate the supply of air to said air engine at the expiration of a certain length of time.

2. In a signal system having a source of air under pressure and an air operated signal device, the combination of valve means for controlling the supply of air under pressure from said source to said signal device, a rotary member for periodically causing operation of said valve means to supply air under pressure to said signal device, an air operated engine for causing rotation of said rotary member, a valve device for controlling the supply of air under pressure from said source to said air operated engine, means operative to cause continued operation of said valve device to supply air under pressure to said air engine, and means responsive to a predetermined rotative movement of said rotary member for causing operation of said valve device to terminate the supply of air under pressure to said air engine.

3. In a signal system having a source of air under pressure and an air operated signal device, the combination of valve means for controlling the supply of air under pressure from said source to said signal device, a rotary member for periodically causing operation of said valve to supply air under pressure to said signal device, an air operated engine for causing rotation of said rotary member, a valve device for controlling the supply of air under pressure from said source to said air operated engine, momentarily operable means for causing operation of said valve device to supply air under pressure to said air engine, means effective in response to the operation of the momentarily operable means to cause said valve device to continue to operate to cause the supply of air under pressure to said air engine, and timing means effective at the expiration of a certain length of time following the operation of the momentarily operable means for causing said valve device to terminate the supply of air to said air engine.

4. In a signal system having a source of air under pressure and an air operated signal device, the combination of valve means for controlling the supply of air under pressure from said source to said signal device, a rotary member for periodically causing operation of said valve to supply air under pressure to said signal device, an air operated engine for causing rotation of said rotary member, a valve device for controlling the supply of air under pressure from said source to said air operated engine, momentarily operable means for causing operation of said valve device to supply air under pressure to said air engine, means effective in response to the operation of the momentarily operable means to cause said valve device to continue to operate to cause the supply of air under pressure to said air engine, and means responsive to a predetermined rotative movement of said rotary member for causing said valve device to be operated to terminate the supply of air to said air engine.

5. In a signal system having a signal device, the combination of two electrical relays each having a winding effective when energized to cause pick-up of the corresponding relay, means responsive to the pick-up of each of said relays for causing energization of the winding of the corresponding relay whereby to maintain the relay picked-up, means operative while one of said relays is picked-up for causing operation of said signal device to produce one certain coded signal, means operative while the other of said relays is picked-up for causing operation of said signal device to produce a different coded signal, and a single timing means set in operation in response to the pick-up of either of said relays for effecting deenergization of the winding of the relay which is picked-up and the consequent restoration of the relay to its dropped-out position at the expiration of a certain length of time following the pick-up of the relay.

6. In a signal system having a signal device, the combination of a plurality of selectively operable control devices, electroresponsive means effective when energized to cause operation of the signal device to produce an audible signal and upon deenergization to cause cessation of operation of the signal device, an automatic signal coding device set in operation in response to the operation of only one of said selectively operable control devices for alternately energizing and deenergizing said electroresponsive means, means responsive to the operation of only another of said selectively control devices for causing continuous energization of said electroresponsive device, and timing means set in operation in response to the operation of any of said selectively operable control devices for effecting permanent deenergization of said electroresponsive device at the expiration of a certain length of time following the initial operation of the selectively operable control device.

7. In a signal system having an audible signal device, electroresponsive means effective when energized to cause operation of the signal device and when deenergized to terminate operation of said signal device, a plurality of selectively operable control devices, a rotary signal coding member, motive means for rotating said rotary member, means operative in responsive to the operation of any one of said selectively operable control devices for causing operation of the motive means to rotate said rotary member, means responsive to the operation of one of said selectively operable control devices for causing said electroresponsive means to be alternately energized and deenergized under the control of said rotary member, means responsive to the operation of another one of said selectively operable control devices to cause continuous energization of said electroresponsive means, and means responsive to a predetermined rotative movement of said rotary member for permanently interrupting energization of said electroresponsive device and for causing said motive means to terminate rotative movement of said rotary member.

8. In an air raid warning system having an audible signal device, the combination of electroresponsive means effective while energized to cause operation of said signal device to produce an audible signal and while deenergized to cause termination of the operation of said signal device, a circuit for energizing said electroresponsive means including a switch device having a rotary element effective upon rotation to cause the switch device to be alternately closed and opened, motive means for rotating the rotary element of said switch device, a normally closed switch so constructed and arranged as to be momentarily opened in one predetermined position of the rotary element of said switch device, an electrical relay, switch means operative to cause pick-up of said relay, means responsive to the pick-up of said relay for establishing an energizing circuit for the winding of said relay including said normally closed switch for maintaining the relay picked-up independently of the said switch means, said relay being effective when picked-up to cause operation of said motive means to rotate the rotary element of said switch device and also effective when picked-up to condition said circuit including the said switch device whereby to render said electroresponsive means energizable and deenergizable under the control of said switch device, said normally closed switch being effective when momentarily opened as the rotary element of said switch device passes through the said one predetermined position thereof for causing restoration of said relay to its dropped-out position, said relay being effective when restored to its dropped-out position to cause said motive means to terminate rotation of the rotary element of said switch device and also effective to open said circuit to render said switch device non-effective to cause energization of said electroresponsive means.

9. In a signal system having a signal device, the combination of electroresponsive means effective while energized to cause said signal device to produce an audible signal and while deenergized to cause said signal device to terminate such audible signal, a switch device having a rotary element effective upon rotation to cause the switch device to be alternately closed and opened, motive means for rotating the rotary element of said switch device, a pair of normally closed switches, means for momentarily opening said switches simultaneously when the rotary element of said switch device rotates through a predetermined position thereof, a pair of electrical relays, means for causing one or the other of said relays to be selectively picked-up, one of said relays being effective in response to the pick-up thereof for establishing a self-holding circuit including one of said normally closed switches for maintaining itself picked-up, the other of said relays being effective in response to the pick-up thereof for establishing a self-holding circuit including the other of said normally closed switches for maintaining itself picked-up, said two relays being severally effective when picked-up to cause said motive means to rotate the rotary element of said switch device and when dropped-out to cause the motive means to cease rotating the rotary element of said switch device, means effective in response to the pick-up of one of said relays for conditioning a circuit including said switch device and said electroresponsive means whereby to cause said electroresponsive means to be alternately energized and deenergized under the control of said switch device, means responsive to the pick-up of the other of said relays for causing said electroresponsive means to be continuously energized as long as said other relay is picked-up, said normally closed switches being severally effective when the rotary element of said switch device passes through the said predetermined position thereof to interrupt the self-holding circuit for the corresponding relay and thereby cause restoration thereof to its dropped-out position.

10. In a control system for a signal device, the combination of two selectively operable control devices, means operative in response to the operation of one of said control devices for causing operation of said signal device to produce one predetermined coded signal for at least a certain length of time, means operative in response to the operation of the other of said control devices to cause operation of said signal device to produce a different coded signal for at least said certain length of time, and means effective in response to the operation of said one selectively operable control device, while the last said means is operating to cause said signal device to produce said different coded signal, for rendering the last said means non-operative and the first said means operative, thereby causing said signal device to cease producing said different coded signal and operate to produce said one coded signal.

11. In a signal system having a signal device, the combination of a plurality of selectively operable members, apparatus responsive to the operation of only one of said selectively operable members for causing operation of the signal device to produce one coded signal and operative in response to the operation of only another of said selectively operable members for causing operation of said signal device to produce a different coded signal, and means effective upon the operation of any one of said selectively operable members for causing said apparatus to be operated for a certain length of time and then cease operation.

12. In a control system for a signal device, the combination of two selectively operable control devices, means operative in response to the momentary operation of only one of said control devices for causing operation of said signal device to produce one certain coded signal for a certain length of time, means operative in response to the momentary operation of only the other of said control devices to cause operation of said signal device to produce a different coded signal for said certain length of time, and means effective in response to the momentary operation of said one selectively operable control device while the last said means is operative in response to operation of the said other control device, for rendering the last said means non-operative and the first said means operative for the remainder of the corresponding certain length of time.

13. In a control system for a signal device, the combination of two selectively operable control devices, mechanism operative at one time in response to the momentary operation of only one of said control devices for causing operation of said signal device in a manner to produce one certain coded signal for a certain length of time and operative at another time in response to the momentary operation of only the other of said control devices for causing operation of said signal device in a manner to produce a different coded signal for said certain length of time, and means effective in response to the momentary operation of said one selectively operable control device, while said mechanism is operating to cause operation of the signal device to produce said different coded signal, for causing said mechanism to operate for the remainder of said certain length of time to cause operation of the signal device to produce said certain coded signal instead.

14. In a signal system having a signal device, the combination of means including a control circuit operative while said circuit is closed for causing actuation of the signal device, a switch device in said circuit having a rotary operating element arranged to effect closing of the switch device in a plurality of successive uniformly angularly spaced positions thereof and opening of the switch device in other positions, and mechanism for effecting step-by-step rotary movement of the rotary operating element in such a manner that a plurality of rotary step movements of the operating element occurs between successive ones of the said angularly spaced positions thereof whereby to produce a certain desired interval of non-actuation between successive actuated periods of the signal device.

15. In a signal system having a signal device, the combination of means including a control circuit operative while said circuit is closed for causing actuation of the signal device, a switch device in said circuit having a rotary operating element arranged to effect closing of the switch device in a plurality of successive uniformly angularly spaced positions thereof and opening of the switch device in other positions, and mechanism for effecting step-by-step rotary movement of the rotary operating element in such a manner that the angular spacing between said successive spaced positions of the operating element is a multiple of the angular movement of the operating element effected in a single step operation of the said mechanism, thereby producing a certain desired interval of non-actuation between successive actuated periods of the signal device.

16. In a signal system having a signal device, the combination of two relays each of which has an operating winding effective when energized to cause pick-up of the corresponding relay, two selectively operable switch devices one of which is effective when operated momentarily for causing energization of the winding of one of said relays and the other of which is effective when operated momentarily to cause energization of the winding of the other of said relays, a holding circuit for said one relay including a self-holding contact of said one relay effective in response to pick-up of said one relay to maintain the winding of the relay energized and the relay consequently picked-up independently of the said one switch device, a second holding circuit for the other of said relays including a self-holding contact of said other relay effective to maintain the winding of the said other relay energized and the relay consequently picked-up independently of said other of the switch devices, means operative while said one relay is picked-up for causing operation of the signal device to produce one certain coded signal, means operative while the other of said relays is picked-up for causing operation of said signal device to produce a different coded signal, and a single timing means set in operation in response to pick-up of either of said relays for interrupting the holding circuit of the corresponding relay a certain interval of time following the pick-up of such relay to cause restoration of such relay to its dropped-out position and the consequent cessation of operation of the signal device.

ROBERT A. MITCHELL.
CLAUDE M. HINES.